April 22, 1952 W. E. BURGE 2,593,726
APPARATUS FOR CUTTING BLOCKS
Filed Sept. 20, 1948 3 Sheets-Sheet 1
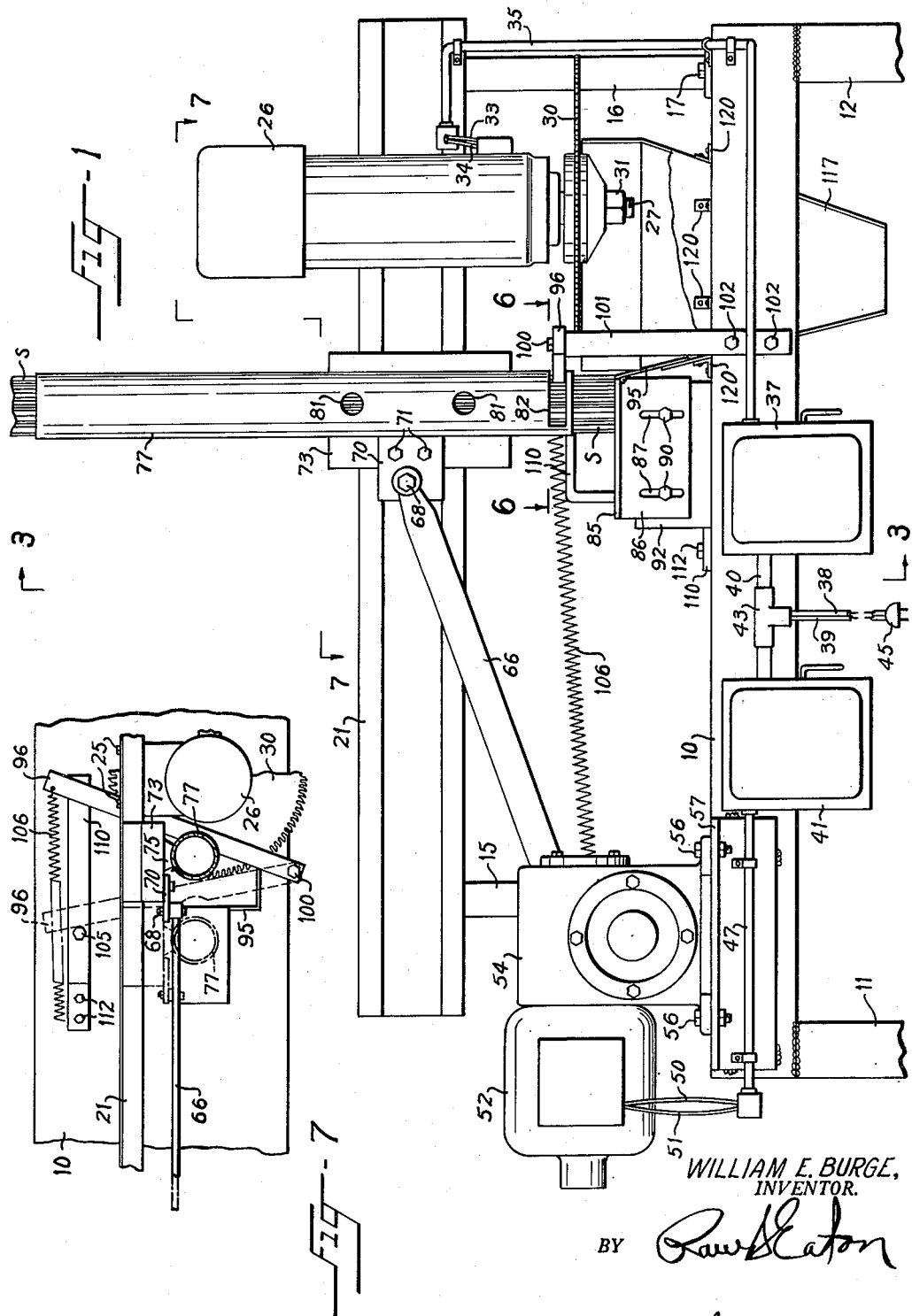
WILLIAM E. BURGE,
INVENTOR.
BY
ATTORNEY.

April 22, 1952 W. E. BURGE 2,593,726
APPARATUS FOR CUTTING BLOCKS
Filed Sept. 20, 1948 3 Sheets-Sheet 2
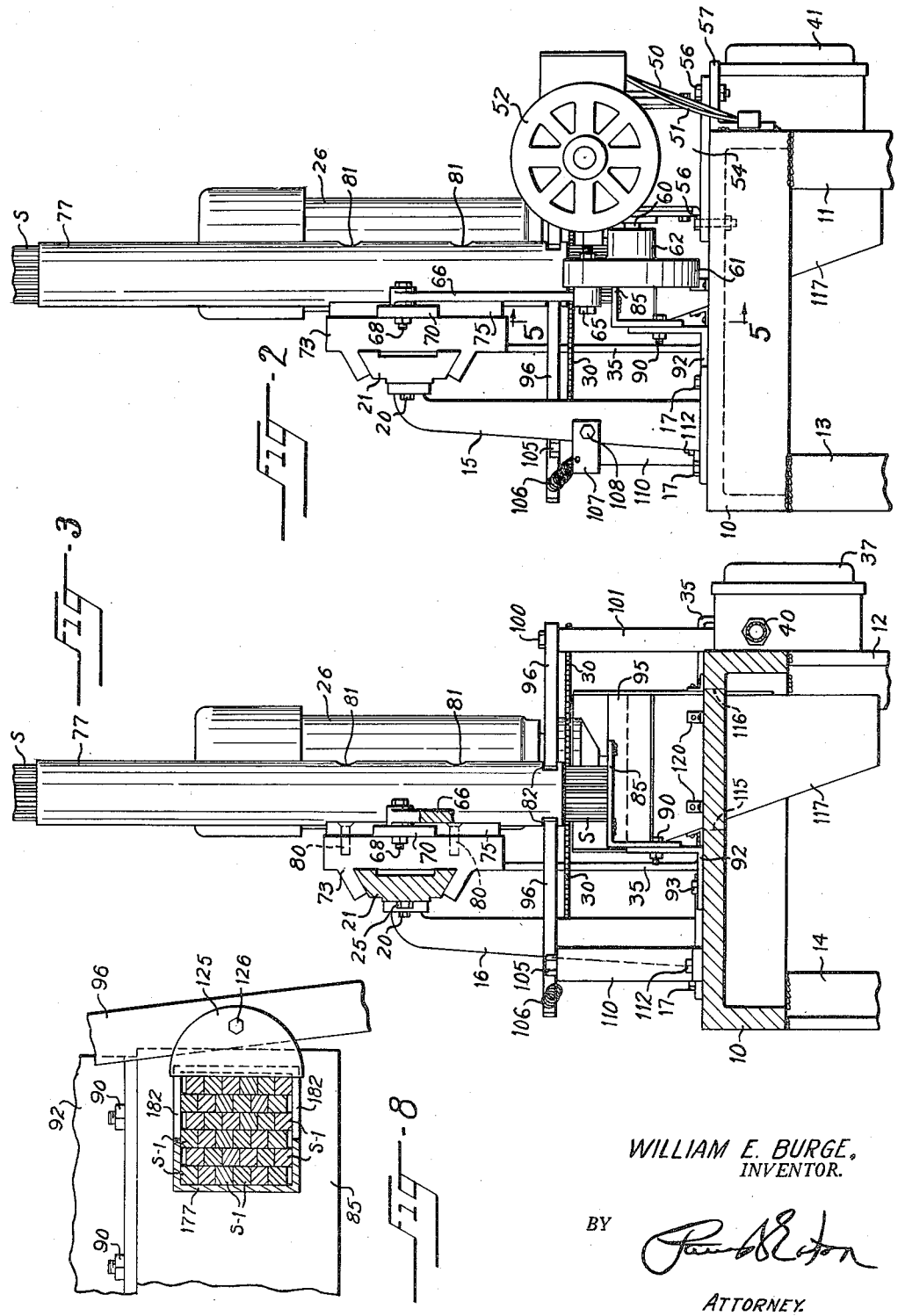
WILLIAM E. BURGE,
INVENTOR.
BY
ATTORNEY.

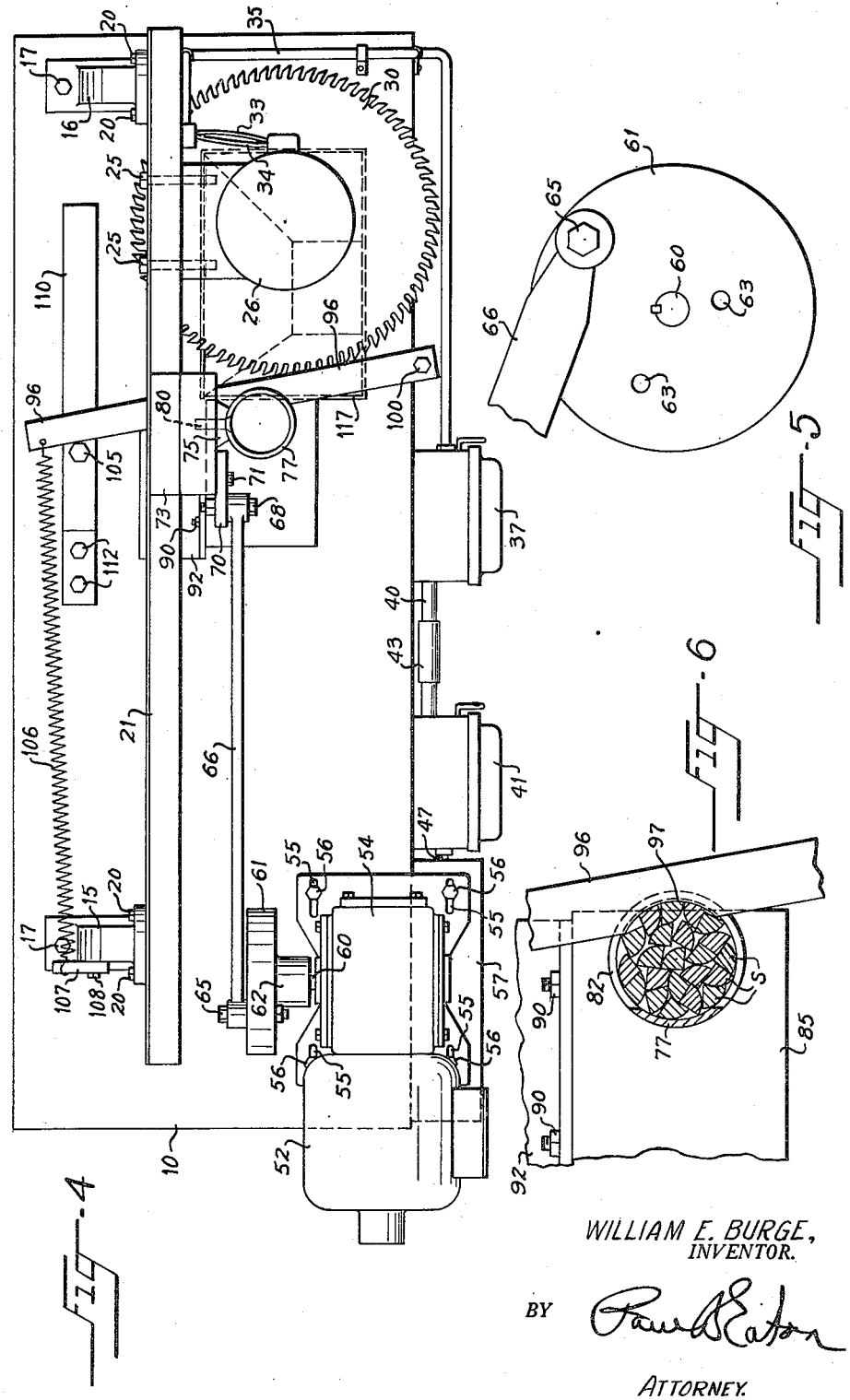

Patented Apr. 22, 1952

2,593,726

UNITED STATES PATENT OFFICE 2,593,726

APPARATUS FOR CUTTING BLOCKS

William E. Burge, Winston-Salem, N. C.

Application September 20, 1948, Serial No. 50,069

3 Claims. (Cl. 143—54)

This invention relates to woodworking machinery and more especially to a machine for cutting elongated strips of wood, plastic or the like, in quantity into short lengths such as are used in the manufacture of furniture for reinforcing the corners of dresser drawers and tables, as well as for drawer stops and the like.

It is an object of this invention to provide a means for cutting strips of wood, plastic or other cuttable material into short lengths, the length of each piece being identical, wherein a plurality of the strips are placed in a tubular member, so inclined as to feed the strips downwardly by gravity, the lower end of the tubular member terminating a short distance above the plane of a cutting blade, and the lower ends of the strips of material resting against a stop plate which is adjustable relative to the cutting blade for cutting the desired length from the strips and having means for clampingly engaging the strips of material, as they are fed past the cutting blade, at a point above the plane of the cutting blade, whereby the short pieces will fall, by gravity, into a suitable container as they are cut away from the strips by the cutting blade, and after all the strips have been cut, the tubular member will move out of the path of the cutting blade and away from the clamping means, thus allowing the strips of material to again fall, by gravity, against the adjustable stop plate for a repeat operation.

It is another object of this invention to provide a table which supports a horizontally disposed guide member thereabove and in spaced relation thereto and which has an electric motor secured adjacent on one end thereof, the axis of which is disposed on a vertical plane, and on the shaft of which a saw is fixedly mounted. The horizontally disposed guide member has a vertically disposed tubular member mounted for lateral sliding movement thereon and means are connected to the vertically disposed tubular member for transmitting reciprocatory horizontal motion to the same. This tubular member is open at its upper and lower ends and strips of wood material, or the like, are inserted into the upper end of the tubular member and there is disposed in spaced relation thereto, below the lower end of the tubular member, a vertically adjustable, horizontally disposed plate member which is adapted to support the lower ends of the strips of material as they are placed in the tubular member and then, as the tubular member is moved toward the saw, the lower ends of the strips move off the supporting plate member. However, as the strips move toward the saw they are engaged at one side thereof at a point above the horizontal plane of the saw by a resiliently mounted arm which prevents these strips from falling downwardly further out of the vertically disposed tubular member after they have moved off of the horizontally disposed plate member and while they are being sawed into short pieces. After these pieces have been sawed into short strips, the short pieces will fall downwardly, by gravity, into a suitable container or into a suitable trough or the like for directing them to another part of the plant, as desired. On the return stroke of the vertically disposed guide member, the resiliently mounted bar moves out of engagement with the strips of material and thus permits the strips to fall downwardly onto the support plate for a repeat operation.

Some of the objects of the invention having been stated, other objects will appear as the description proceeds when taken in connection with the accompanying drawings, in which Figure 1 is a side elevation of the machine with the lower parts of the legs which support the table being broken away.

Figure 2 is an end elevation of the machine looking from the left hand side of Figure 1;

Figure 3 is a vertical sectional view taken along the line 3—3 in Figure 1;

Figure 4 is a top plan view of the machine looking down at the top of Figure 1;

Figure 5 is an enlarged elevation looking substantially along the line 5—5 in Figure 2;

Figure 6 is an enlarged sectional plan view taken along the line 6—6 in Figure 1;

Figure 7 is a top plan view of the right-hand central portion of Figure 4 showing the parts in one position in solid lines and in another position in dotted lines and also being taken substantially along the line 7—7 in Figure 1 but showing the parts on a smaller scale;

Figure 8 is a modified form of the work holding tube from that shown in Figure 6.

Referring more specifically to the drawings, the numeral 10 indicates the bed of the machine having legs 11, 12, 13 and 14 welded thereto. Suitable spaced upright supports 15 and 16 are secured at their lower ends, as by screws 17, to the bed plate 10, and a horizontally disposed male dove-tail guide member 21 is secured, as by screws 20, to the upper ends of these supports 15 and 16.

Secured to the front surface of the horizontally disposed dove-tail guide member 21, as by screws 25, is an electric motor 26 having a motor shaft 27 extending from the lower end thereof on which a suitable circular saw 30 is fixedly secured as by a nut 31 threadably mounted on the lower end of the shaft 27. The electric motor 26 has electric wires 33 and 34 extending from the same to a suitable conduit 35 which extends downwardly along the support member 16 and forwardly to the front of the machine and then along the front face of the bed 10 and the other end of the same is connected to a conventional switch box 37. A conduit 40 extends from the other side of the switch box 37 to a switch box 41 and this conduit 40 has a pipe T 43 therein out of which electric wires 38 and 39 project and these wires 38 and 39 extend to a suitable male plug 45 which is adapted to be plugged into a suitable source of electrical energy, not shown.

The switch box 41 has a conduit 47 extending from the left-hand side thereof in Figure 1 and electric wires 50 and 51 extend from the other end of the conduit 47 to an electric motor 52 which is supported by and drives conventional gearing in a conventional gear reduction box 54 having slots 55 in the bottom flange thereof which are penetrated by bolts 56 for adjustably securing the gear reduction box 54 to the bed plate 10 a well as to an angle bar 57 welded to the front face of the horizontally disposed bed plate 10. In this instance, the motor 52 and the gear box 54 are integral with each other and they comprise a unit such as is manufactured by Boston Gear Works, Inc., 14 Hayward Street, North Quincy 71, Mass., under their number ME 5830W and is referred to as a "Boston Ratiomotor" in Boston's catalog No. 54.

The gear reduction box 54 has a shaft 60 extending outwardly from one side thereof and on which a disk 61 having a hub portion 62 is fixedly mounted (Figures 2 and 4). This disk 61 has a plurality of bores 63 therein which are spaced at various distances from the center of the disk 61 and any one of which may be penetrated by a shoulder bolt 65 on which one end of a connecting rod 66 is oscillatably mounted. The bores are thus positioned for varying the length of stroke of the rod 66. The connecting rod 66 (Figures 1 and 4) extends to the right in Figure 1 from the disk 61 and also extends upwardly at an angle in Figure 1 and is oscillatably mounted at its right-hand end thereof on a shoulder bolt 68 secured in a vertically disposed plate 70.

The plate 70 is secured, as by screws 71, to a cast female dove-tail guide block 73 which is mounted for horizontal sliding movement on the male dove-tail guide member 21. The cast female dove-tail guide block 73 has a projecting portion 75 the front surface of which conforms to the curvature of a vertically disposed tubular member 77 which is secured to the forwardly projecting portion 75 as by screws 80 (Figures 3 and 4). The vertically disposed tubular member 77 has openings 81 therein which are in alinement with the screws 80 to thus provide access to the screws 80 for securing the tubular guide member 77 to the forwardly projecting portion 75 of the female guide block 73.

The vertically disposed tubular member 77 extends downwardly a substantial distance below the female dove-tail guide block 73 and terminates on a plane slightly above and adjacent to the saw 30 (Figure 1). The vertically disposed tubular member 77 has a notch 82 therein (Figure 6) which extends from one side thereof to a point adjacent the other side thereof, or in other words, extends for approximately 280 degrees around the periphery of the tubular guide member or work holder 77. The purpose of the notch 82 will be later described.

The tubular guide member or work holder 77 is adapted to receive a plurality of strips S and these are inserted at the upper end thereof and fall downwardly by gravity and the lower ends of the same are supported on a horizontally disposed plate 85 having a vertically disposed portion 86 extending downwardly therefrom and this portion 86 has vertically disposed slots 87 therein which are adapted to be penetrated by bolts 90 for adjustably securing the plate 85 to an angle bar 92. The angle bar 92 is secured, by any suitable means such as screws 93 to the top surface of the bed plate 10 (Figures 2 and 3). The horizontally disposed plate 85 in Figure 1 has the upper end of a downwardly and outwardly extending plate 95 welded to the right-hand end thereof the purpose of which will be later described. The plate 85 serves as a stop and support of slats or workpieces S when they are dropped into the tubular work holder 77.

Referring to Figures 1 and 6 it may be observed that the notch 82 in the lower end of the vertically disposed tubular member 77 is adapted to receive a portion of a horizontally disposed lever bar 96 which has an arcuately formed cut away portion 97, the vertical surface of which is adapted to engage the strips of material S adjacent their lower ends which are disposed in the tubular member 77 when the tubular member 77 is moved towards the saw 30. The lever bar 96 is pivotally mounted as at 100 on the upper end of a standard 101 which extends downwardly and is secured as by screws 102 to the front surface of the bed plate 10 (Figure 1). The lever bar 96 extends rearwardly and is normally urged against a stop screw 105 by a tension spring 106, the other end of which is connected to a suitable spring perch 107 secured, as by a screw 108, to the upright support 15 (Figures 2 and 4).

The free end of the lever bar 96 also has horizontal sliding movement of a Z-shaped member 110 in which the screw 105 is threadably imbedded. This Z-shaped member 110 is secured as by screws 112 to the bed 10 of the machine.

The bed plate 10 has an opening therein which is defined by the dotted lines 115 and 116 in Figure 3 and which is penetrated by a funnel-shaped member 117 secured as by angle clips 120 to the bed plate 10. The upper ends of the front, rear and right hand walls of the funnel-shaped member 117 terminate immediately adjacent the lower surface of the circular saw 30 while the left-hand wall in Figure 1 terminates a substantial distance below the horizontal plane of the horizontally disposed plate 85 which supports the lower ends of the strips of material S.

This is to permit that portion of the strips S disposed below the horizontal plane of the circular saw 30 to move into the open upper end of the funnel-shaped member 117 so that as the lower ends of the strips S are cut away they will fall into the funnel-shaped member 117 and be guided into a suitable container or trough, or the like, for delivery of the same to other parts of the plant, as desired. It will be noted in Figure 1 that the plate 95, which is welded to the right-hand end of the plate 85 extends downwardly against the inner face of the left-hand wall of the funnel-shaped member 117 to prevent the blocks cut from the strips S by the circular saw 30 from falling outside of the funnel-shaped member 117 regardless of how the horizontally disposed plate 85 is adjusted relative to the bed plate 10.

In all figures of the drawings except Figure 8, I have shown a work holding tube which is substantially circular in cross-section which is very suitable for sawing quarter-round members, but where members which are rectangular in cross-section are desired to be sawed, it is preferable to have a tube 177 which is rectangular in cross-section for receiving strips S-1 which are rectangular in cross-section. This tube 177 is identical in all other respects to the circular tube 77 and instead of having a lever bar 96 provided with a cavity to conform to the convexity of the bulk of the work strips S, I have pivotally mounted a member 125 as at 126 on the lever bar 195 so that it can pivot to cause its squared edge to apply equal pressure at all times to the work pieces S-1 by sliding into a slot 182 in the tubular member 177.

Method of operation

In operation the switches in the switch boxes 37 and 41 are closed to thus start the electric motors 26 and 52, respectively, which will in turn transmit rotation to the circular saw 30 and the disk 61, respectively. Before starting the electric motor 52, a plurality of the strips S are placed in the tubular member 77 in the manner heretofore described with the tubular member 77 in the dotted line position shown in Figure 7 and it is thus seen that the lower ends of the strips of material S will be supported on the plate 85. The motor 52 is then started and rotation of the disk 61 will cause the female dove-tail guide block 73 to reciprocate in a horizontal plane on the male dove-tail guide bar 21.

Attention is called to the fact that when the tubular member 77 is in the dotted line position shown in Figure 7 the lever bar 96 is also in the dotted line position shown in Figure 7 and is held away from the tubular member 77 by the screw 105. Now, as the tubular member 77 moves from left to right in Figures 1 and 7, the notched portion 82 of the tubular member 77 straddles the bar 95 and the arcuate portion 97 of the guide bar 96 engages the right-hand surfaces of the strips of material S which are nearest the right-hand side of the tubular member 77 in Figures 1 and 6 and the spring 106 will thus exert pressure through the medium of the bar 96 against the strips S in the tubular member 77 whereby, as the lower ends of the strips S move off the plate 85 in Figure 1, the lever bar 96 will clampingly secure the strips S in the tubular member 77 thus preventing them from falling downwardly, by gravity, during the cutting operation.

The tubular member 77 then continues to move from left to right to the solid line position shown in Figure 7, during which time the circular saw 30 cuts the lower ends of the strips S into short blocks, the lengths of which are determined by the position of the horizontally disposed plate 85 relative to the circular saw 30.

After the blocks are cut from the strips S by the saw 30, they will fall by gravity into the funnel-shaped member 117 for directing the same to a suitable container or trough for carrying the same to another portion of the plant.

It will be noted that the tubular member 77 moves from the dotted line position of Figure 7 to the solid line position, the lever bar 96 is moved also from the dotted line position in Figure 7 and it is obvious that upon the return stroke of the tubular member 77 and associated parts, the parts will return to the dotted line position shown in Figure 7.

This operation is repeated until as many blocks as possible have been cut from the strips S in the tubular member 77 at which time the switch 41 in the switch box is opened, thus stopping the electric motor 52 for a reloading operation and after which the operation as heretofore described is repeated.

In the drawings and specification there has been set forth a preferred embodiment of the invention and although specific terms are employed, they are used in a generic and descriptive sense only, and not for purposes of limitation, the scope of the invention being defined in the claims.

I claim:

1. A machine for automatically and simultaneously cutting a plurality of strips of material such as wood, plastic and the like into blocks of identical length comprising a framework having a bed plate and a horizontally disposed guide member disposed above the bed plate in spaced relation thereto, a vertically disposed elongated tubular member mounted for horizontal and reciprocating sliding movement on the guide member, the lower end of said tubular member terminating a substantial distance above the bed plate, a vertically adjustably horizontally disposed plate mounted on the bed plate and disposed below and in spaced relation to the path of travel of the lower end of the tubular member, said tubular member having a notch cut in the periphery thereof adjacent the lower end thereof, said horizontally disposed plate being adapted to support the lower ends of the strips of material as they are placed in the tubular member, a horizontally disposed circular saw disposed adjacent and above the vertically adjustable horizontally disposed plate, means for transmitting horizontal reciprocatory motion to the vertically disposed tubular member for moving the strips of material into engagement with the saw, the horizontal plane of said saw being disposed a slight distance below the path of travel of the lower end of the tubular member, a horizontally disposed lever bar pivoted at one end on the framework and extending across the path of travel of the tubular member, spring means for urging the lever bar into the notch in the tubular member as it moves toward the saw to thereby engage the strips of material therein to clamp them against the opposite wall of the tubular member, a stop on the opposite side of the framework from said pivot for limiting movement of the lever to cause it to be disengaged from the strips of material when the tubular member has moved from over the saw and a funnel shaped member disposed below the cutting blade for directing the blocks cut from the strips by the cutting blade into a suitable container or trough or the like.

2. A machine for cutting strips of material such as wood, plastic and the like, in quantity, into blocks of a predetermined length comprising a fixed frame, a driven circular saw mounted for rotation in the frame the axis of which is disposed in a vertical plane, a slide on the frame, a carriage mounted on the slide for reciprocatory movement towards and away from the saw, a vertically disposed tubular member mounted on the carriage, the lower edge of which is disposed slightly above the horizontal plane of the circular saw and into which the strips of material to be cut into blocks are placed, a horizontally disposed plate disposed in spaced relation below the lower end of the tubular member and being spaced a substantial distance below the horizontal plane of the circular saw for supporting the lower ends of the strips of material that have been placed in the tubular member, means for transmitting reciprocatory horizontal motion to the vertically disposed tubular member whereby the lower end of the tubular member passes by the circular saw, thus cutting a portion from the lower ends of the strips of material, said tubular member having a horizontally disposed slot in the side thereof which is nearest the saw, said horizontally disposed plate terminating in a vertical plane in spaced relation to the cutting edge of the circular saw, a horizontally disposed pivoted lever bar pivoted at one end of the frame and extending across the path of travel of the strips of material and spring means for resiliently forcing the horizontally disposed bar through said slot in the tubular member and against the strips of material in such a manner as to clampingly secure the strips of material against the opposite surface of the tubular member just prior to the time the lower ends of the strips move off the horizontally disposed plate to hold the strips against downward movement as their lower portions are presented to the saw whereby as the portions of the strips that are disposed below the horizontal plane of the saw are cut away from the main portion of the strips, they will have moved off the horizontally disposed plate and the horizontally disposed pivoted bar will clampingly secure the strips of material during the cutting operation, a projection mounted on the frame on the opposite side of the frame from said pivot and disposed in the path of travel of the free end of the pivoted horizontally disposed lever bar, thus arresting movement of the same upon a return stroke of the tubular member from over the saw whereby said tubular member will move away from the horizontally disposed lever bar, thus permitting the strips of material to fall downwardly by gravity to cause their lower ends to rest upon the top surface of the horizontally disposed plate for a repeat operation.

3. In a machine for cutting short pieces from one end of a plurality of strips of material, such as elongated pieces of wood, a main frame, a circular saw mounted near one end of the main frame to rotate on a vertical axis, a slide mounted on the main frame, a reciprocating carriage mounted on the slide for movement towards and away from the saw, means for imparting reciprocatory movement to said carriage towards and away from the saw, said carriage having a vertically disposed tube mounted thereon whose lower end is disposed for travel in a horizontal plane above the saw, said tube having a horizontally disposed slot in the side thereof disposed next to the saw, a vertically adjustable platform mounted on the main frame and disposed in a horizontal plane below the plane of the saw and being disposed adjacent one side of the saw and below said tubular member when it is retracted to a position from over the saw, said tubular member being adapted to receive a plurality of elongated strips of material which will fall by gravity to cause their lower ends to engage said platform, an elongated lever bar pivoted at one end on the main frame in the same plane as the slot in said tubular member and being biased to move toward the tubular member and into said slot to clampingly engage the strips of material just prior to their being moved off the platform and while they are moved into engagement with the saw, stop means positioned on the opposite side of the main frame from said pivot for limiting movement of said lever towards said tubular member to prevent its clamping the strips of material while the tubular member is disposed above said platform, the forward movement of the carriage moving these trips of material into engagement with said pivoted lever bar to cause it to clamp the strips of material as the tubular member is moved forwardly over the saw and whereby the severed ends of the strips of material will fall downwardly below the saw as they are severed and upon the tubular member moving to reverse position over the platform, the stop will engage said pivoted lever bar to release the strips of material to allow them to fall downwardly into engagement with the platform.

WILLIAM E. BURGE.

REFERENCES CITED

The following references are of record in the file of this patent:

UNITED STATES PATENTS

| Number | Name | Date |
|---|---|---|
| 446,510 | Cummings | Feb. 17, 1891 |
| 691,432 | Anderson | Jan. 21, 1902 |
| 850,519 | Busch | Apr. 16, 1907 |
| 2,398,230 | Keller | Apr. 9, 1946 |

FOREIGN PATENTS

| Number | Country | Date |
|---|---|---|
| 866,975 | France | 1941 |